(12) United States Patent
Thuston et al.

(10) Patent No.: US 10,914,404 B2
(45) Date of Patent: Feb. 9, 2021

(54) STUB-OUT CONFIGURATION FOR PLUMBING ASSEMBLY

(71) Applicant: Reliance Worldwide Corporation, Atlanta, GA (US)

(72) Inventors: Dixon Thuston, Birmingham, AL (US); Virgil O'Neil, Sandiego, CA (US); Larry Brown, San Diego, CA (US); Eliana Pippen, Powder Springs, GA (US); Alexander Rycroft, Atlanta, GA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 16 days.

(21) Appl. No.: 16/002,731

(22) Filed: Jun. 7, 2018

(65) Prior Publication Data

US 2019/0376622 A1 Dec. 12, 2019

(51) Int. Cl.
*F16L 3/08* (2006.01)
*E03C 1/02* (2006.01)

(52) U.S. Cl.
CPC ............... *F16L 3/08* (2013.01); *E03C 1/021* (2013.01)

(58) Field of Classification Search
CPC . F16L 55/1141; F16L 3/08; F16L 3/12; F16L 3/123; F16L 3/1236; E03C 1/021
See application file for complete search history.

(56) References Cited

U.S. PATENT DOCUMENTS

| 4,076,282 | A | | 2/1978 | Scott et al. |
| 6,155,286 | A | * | 12/2000 | Geary ..................... D06F 39/08 |
| | | | | 137/360 |
| 6,170,529 | B1 | | 1/2001 | Howe |
| 7,093,859 | B2 | | 8/2006 | Warburton-Pitt et al. |
| 7,252,117 | B1 | | 8/2007 | Glenn |
| 7,328,723 | B1 | * | 2/2008 | Van Meter ............ F16L 55/115 |
| | | | | 138/89.4 |
| 7,487,801 | B2 | * | 2/2009 | Zeyfang ................ F16L 55/115 |
| | | | | 138/89 |
| 7,766,043 | B2 | | 8/2010 | Thomas et al. |
| 8,061,390 | B2 | * | 11/2011 | Condon .................... F16L 3/20 |
| | | | | 138/106 |
| 8,616,229 | B2 | * | 12/2013 | Jacoway ................. E03C 1/021 |
| | | | | 137/15.01 |
| 8,646,488 | B1 | * | 2/2014 | Shindelar .............. F16L 57/005 |
| | | | | 138/104 |

(Continued)

OTHER PUBLICATIONS

International Search Report and Written Opinion issued in International Application No. PCT/US2019/035733 dated Aug. 27, 2019.

*Primary Examiner* — Kevin F Murphy
(74) *Attorney, Agent, or Firm* — Foley & Lardner LLP

(57) ABSTRACT

An assembly includes a flexible tubular member having a medial portion defined between a first end and a second end of the tubular member. The assembly further includes an end cap molded over the first end of the tubular member, such that the end cap seals the first end of the tubular member. The assembly additionally includes a fitting having a first end portion configured to secure to the second end of the tubular member and a bracket attached to the medial portion of the tubular member. The bracket is configured to mount to a structure adapted to secure at least one end of the tubular member in place.

9 Claims, 21 Drawing Sheets

(56) References Cited

U.S. PATENT DOCUMENTS

| | | | |
|---|---|---|---|
| 8,789,854 B2* | 7/2014 | Christian, Jr. | F16L 37/1205 |
| | | | 285/320 |
| 9,340,338 B1 | 5/2016 | Doherty | |
| 9,403,327 B2 | 8/2016 | Rowley | |
| 9,702,499 B1 | 7/2017 | DiPetrillo | |
| 2006/0192382 A1 | 8/2006 | Martineau | |
| 2009/0255107 A1* | 10/2009 | Griffith | E03C 1/021 |
| | | | 29/464 |
| 2010/0032944 A1 | 2/2010 | Anderson | |
| 2010/0037977 A1* | 2/2010 | Rahimzadeh | F16L 55/115 |
| | | | 138/96 R |
| 2013/0000771 A1* | 1/2013 | Beaton | E03C 1/021 |
| | | | 138/96 R |
| 2017/0204996 A1* | 7/2017 | Breda | F16L 3/1025 |

* cited by examiner

STUB-OUT CONFIGURATION FOR PLUMBING ASSEMBLY

FIELD

The present disclosure relates generally to the field of piping assemblies for use in rough plumbing.

BACKGROUND

During construction of a building (e.g., a house), advance plumbing work (i.e., rough plumbing) includes installation of waste and supply piping (such as water or sewer pipes), gas piping, vents, bathtubs, etc. At a place in the interior walls of the building where water comes out to a service, a sealed pipe termination, or "stub out", is provided, which extends out from the plumbing system to the place where the service is to be provided. After the interior walls are installed and the system is pressure tested (as applicable), the pipe ends of the sealed pipes are removed (for example, by cutting off the sealed ends) to allow for fluid communication between the plumbing system and the installed plumbing fixture.

Options for providing the sealed pipe during rough plumbing include copper pipes with spun out caps (where the caps are formed integrally with the pipe) or plastic pipes with separate end caps or plugs installed on the exposed end during rough plumbing. Caps may require cementing to secure in place, and push-in plugs or fittings may require crimping a metal band to seal the closure on the end of the pipe. As another example, caps may require cold expansion, using an appropriate expander tool, in order to secure the caps in place and seal the end of the pipe. Other caps may require a push-fit fitting to cap the end of the pipe. Copper stub-out pipes are generally expensive, due to the cost of materials required to make the pipes. Plastic pipes may be used, although such pipes may require cumbersome and labor-intensive operations in the field. Specifically, a user (e.g., a plumber) may create a stub-out pipe using plastic pipe, then use a separate bracket or a separate fitting elbow and later install a fitting cap to close off the end of the pipe.

SUMMARY

Conventional approaches require the use of an additional sealing material (e.g., cement, glue, etc.) or use of a tool (including, in some cases, a specialized tool such as an expander tool) in order to secure the cap in place on the end of the pipe. Because of these issues, such approaches to sealing the end of the pipe lead to increased installation time and/or increased labor costs associated with rough plumbing.

According to one aspect, of the present disclosure, an assembly includes a tubular member having a middle portion defined between a first end and a second end of the tubular member; an end cap molded over the first end of the tubular member, such that the end cap seals the first end of the tubular member; and a bracket attached to the middle portion of the tubular member and configured to mount to a structure, the bracket adapted to secure at least one end of the tubular member in place.

According to another aspect, a method of use of a plumbing stub portion in a plumbing system includes the steps of connecting a terminal portion of a conduit in the plumbing system to a fluid source; supporting the terminal portion of the conduit; and installing the stub assembly on the terminal portion of the conduit. The stub assembly includes a pipe having a middle portion disposed between a first end and a second end, and an end cap over-molded onto the first end of the pipe. The end cap has an inner diameter configured to fit over an outer diameter of the pipe such that the end cap seals the first end of the pipe.

According to yet another aspect, an installation for a plumbing system for a rough plumbing construction includes a tubular assembly including a flexible tubular member having a first end and a second end and a sealing portion encasing at least the first end of the tubular member such that the sealing portion isolates an outer diameter portion of the first end of the tubular member from an external environment; and a fixation piece having a first end portion configured to attach to the second end of the tubular member, and a second end portion configured to attach to the plumbing system.

According to yet another aspect, a method of making a plumbing component includes the steps of inserting a first end of a flexible tubular member into a mold; molding an end cap over the first end of the tubular member to seal the first end of the tubular member; and inserting a second end of the tubular member into the a mold. The method optionally also includes molding at least one support member over the tubular member at a distance from the end cap.

DETAILED DESCRIPTION

Figure 1:
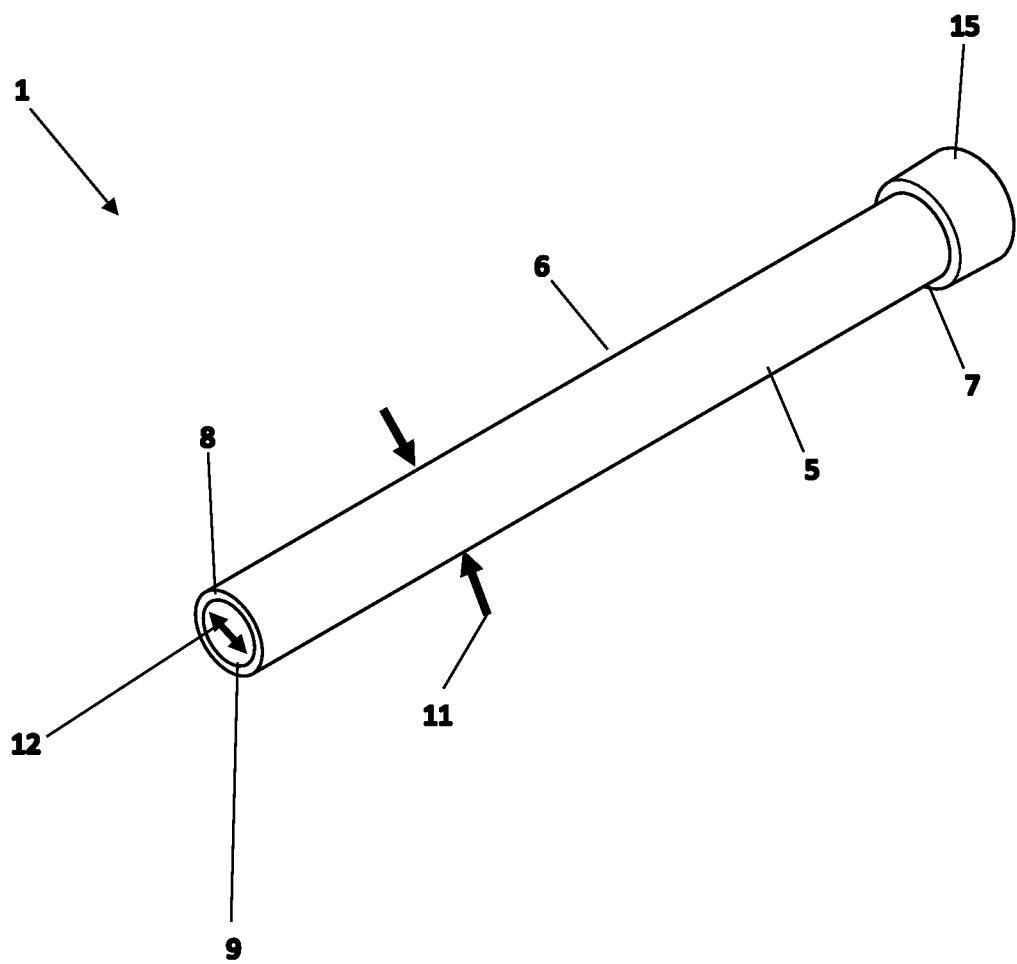
FIG. 1 is a perspective view of a tubular member with a molded-on end cap, according to an exemplary implementation.

Following below are more detailed descriptions of various concepts related to, and implementations of methods, apparatuses, and systems relating to plumbing configurations. The various concepts introduced above and discussed in greater detail below may be implemented in any of numerous ways, as the described concepts are not limited to any particular manner of implementation.

At least one aspect of the present disclosure relates to a rough plumbing assembly which includes a pre-sealed cap for a sealed pipe that such that assembling the cap onto the pipe is not required during the rough plumbing process. Such an assembly allows for lower costs and higher efficiency in the rough plumbing process.

Referring to FIGS. 1-6, a stub-out assembly 1 includes a tubular member (e.g., a pipe, conduit, etc.) 5 having a middle portion (a medial portion) 6. The middle portion 6 is defined between a first end (e.g., first terminal) 7 and a second end (e.g., second terminal) 8 of the tubular member 5. The tubular member 5 has a hollow inner surface 9 configured to allow a fluid to flow through the tubular member 5. The hollow inner surface 9 thereby defines a fluid flow passageway through tubular member 5. The tubular member 5 includes an outer diameter 11 and an inner diameter 12. According to one aspect, the outer diameter 11 is constant for an entire length of tubular member 5, and the inner diameter 12 is constant for the entire length of tubular member 5. A size of the inner diameter 12 is a function of the outer diameter 11 and a wall thickness of the tubular member 5. In the case in which the tubular member 5 is formed of cross-linked polyethylene ("PEX") (as described below), the size of the inner diameter 12 may be determined by controlling the size of the outer diameter 11 and the wall thickness of the tubular member 5.

Figure 20:
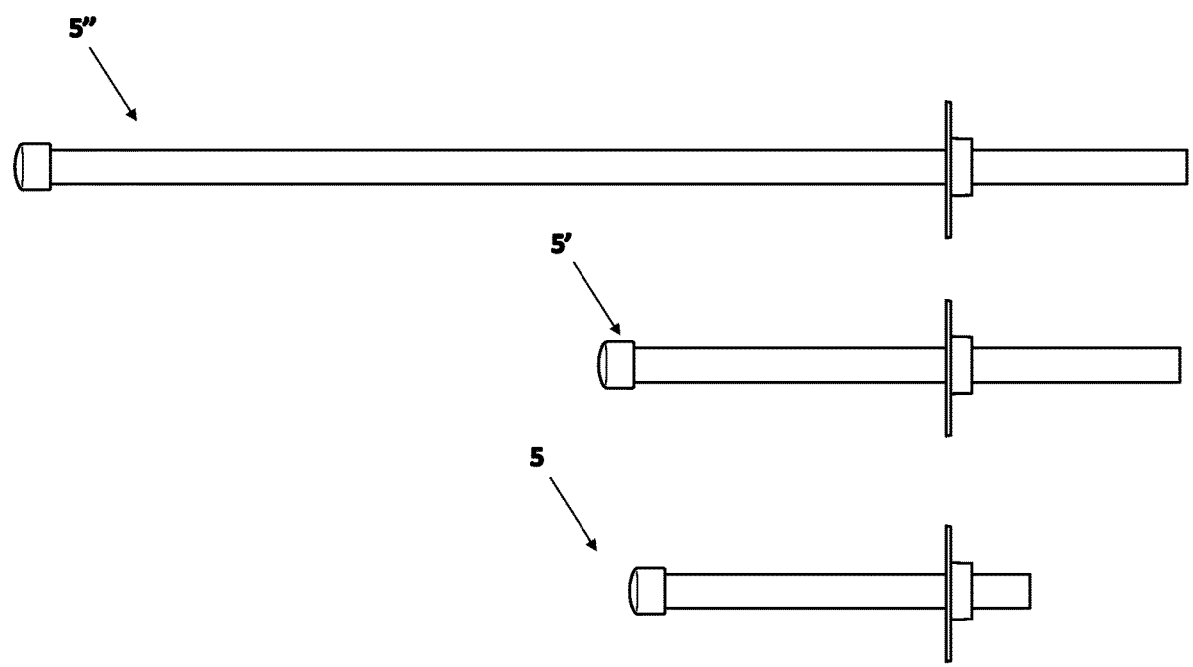
FIG. 20 is a side view of the tubular member shown in FIG. 1, according to one or more implementations.

The tubular member 5 is made of any suitable material. For example, the tubular member 5 may be made of PEX, and as a specific example, the tubular member 5 is made of cured PEX. As another example, the tubular member 5 may be made of copper, though copper would not be used for a curing process which allows over-molding and sealing between the end cap 15 (described below) and the tubular member 5. Further, at least a portion of tubular member 5 may be made out of PEX, while another portion may or may not be made of a different material. Tubular member 5 has any desirable shape; for example, tubular member 5 may be completely straight or, for another example, the tubular member 5 may have a bent or curved shaped. According to one aspect, the tubular member 5 is flexible such that its general shape or a portion thereof can be adaptable when the tubular member 5 is used, for example, as a stub-out for a plumbing system in a building. According to another aspect, the tubular member 5 is provided in pre-bent orientation, with a bend at a predetermined angle along the tubular member 5 to avoid any kinking in the pipe (e.g., because the pipe is too short to be bent in the field without ensuing kinking). The tubular member 5 is of any suitable length. For example, the tubular member 5, as shown in FIG. 20, may have a length of 6 inches. As another example, a tubular member 5' may have a length of 10 inches, while tubular member 5" may have a length of 20 inches.

As shown in FIGS. 1-6, the stub-out assembly 1 also includes an end cap (e.g., a sealing portion) 15 disposed over and around first end 7 of the tubular member 5. The end cap 15 is configured to seal the first end 7 of the tubular member 5 by, for example, encasing at least the first end 7. In one specific example, the end cap 15 covers an entirety of a first planar surface of the first end 7 and at least some of a side portion (for example, at least part of middle portion 6) of the tubular member 5. According to one aspect, the end cap 15 is molded over the first end 7. The end cap 15 may be made of any suitable material; for example, the end cap 15 may be made of PEX, specifically, cured PEX.

Figure 8:
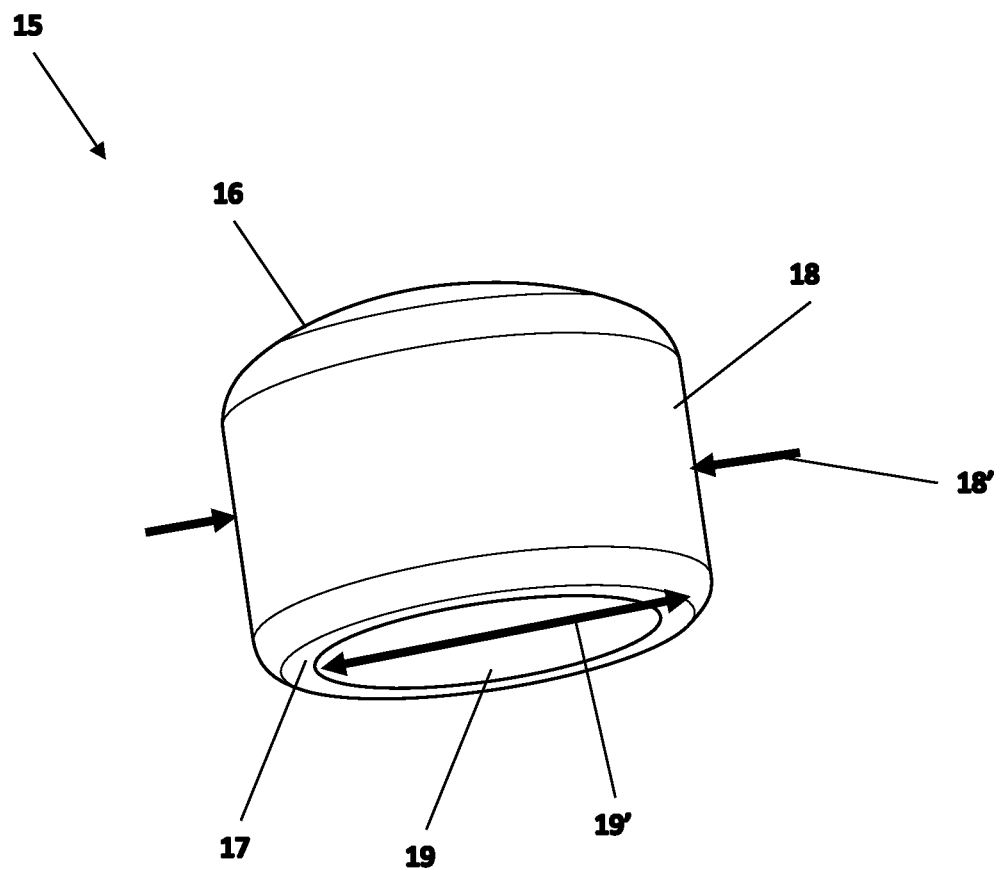
FIG. 8 is a perspective view of an end cap, according to an exemplary implementation.

As shown in FIG. 8, the end cap 15 includes a first, closed end 16. As shown in FIG. 8, the first, closed end 16 is rounded, thereby facilitating installation of the stub-out assembly 1 in a building and not providing an impediment during dry wall hanging in the building. However, first, closed end 16 is not particularly limited to this implementation. The end cap 15 also includes a second, open end 17. The second, open end 17 is configured to receive the first end 7 of the tubular member 5. The end cap 15 also includes an outer surface 18 having an outer diameter 18'. The end cap 15 also includes an inner surface 19 having an inner diameter 19'. The inner diameter 19' is sized appropriately to allow the first end 7 of the tubular member 5 to fit within the inner surface 19 of the end cap 15.

Figure 9:
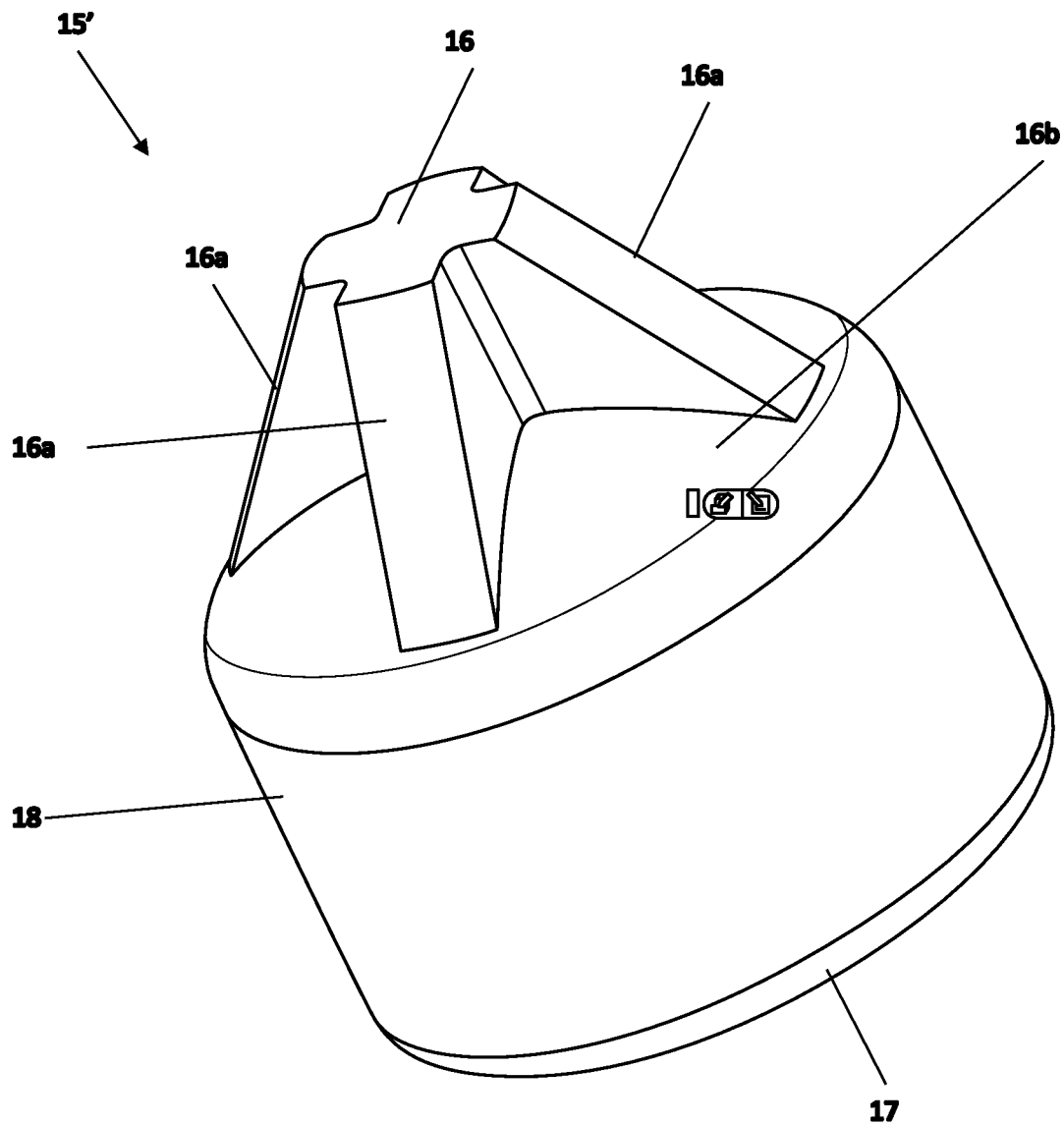
FIG. 9 is a perspective view of the end cap, according to a further implementation.
Figure 10:
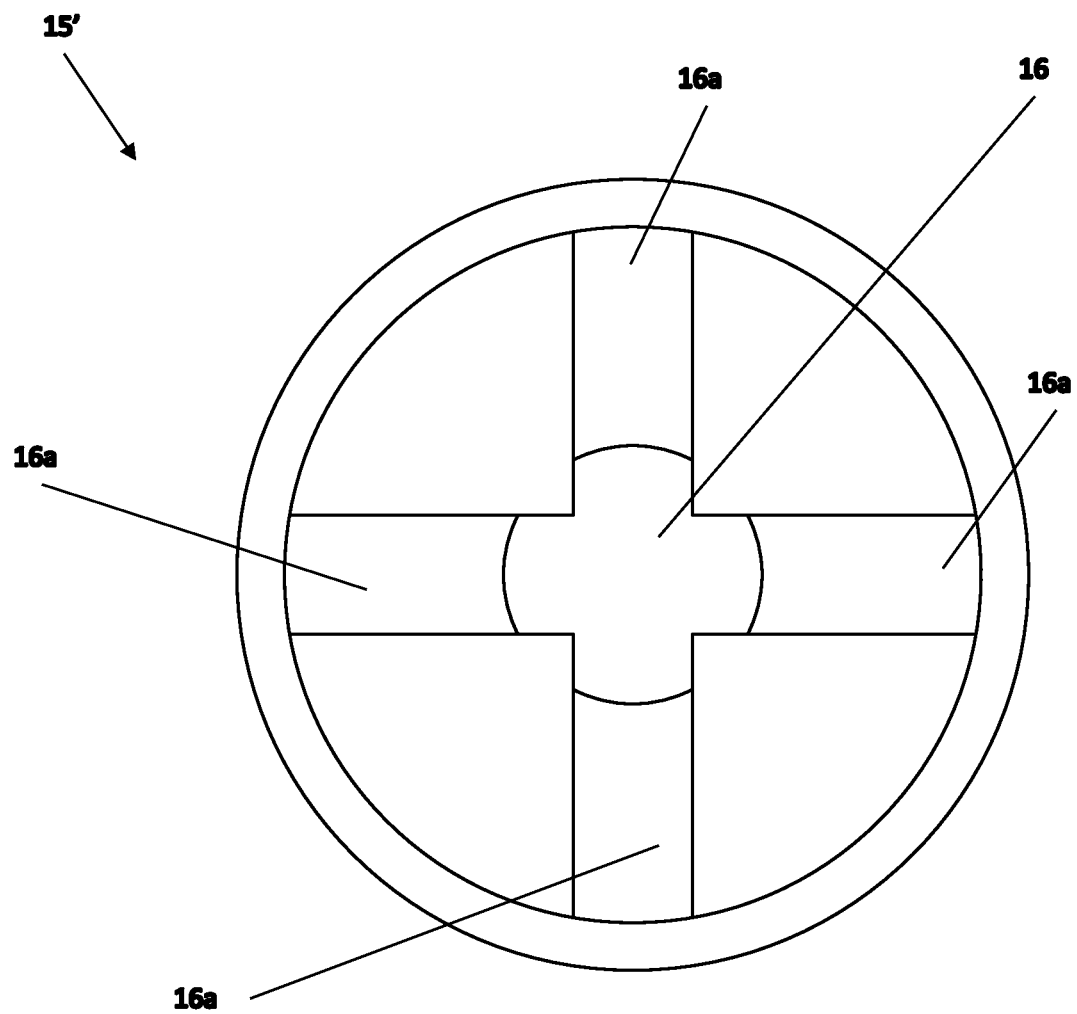
FIG. 10 is a top view of the end cap shown in FIG. 9.
Figure 11:
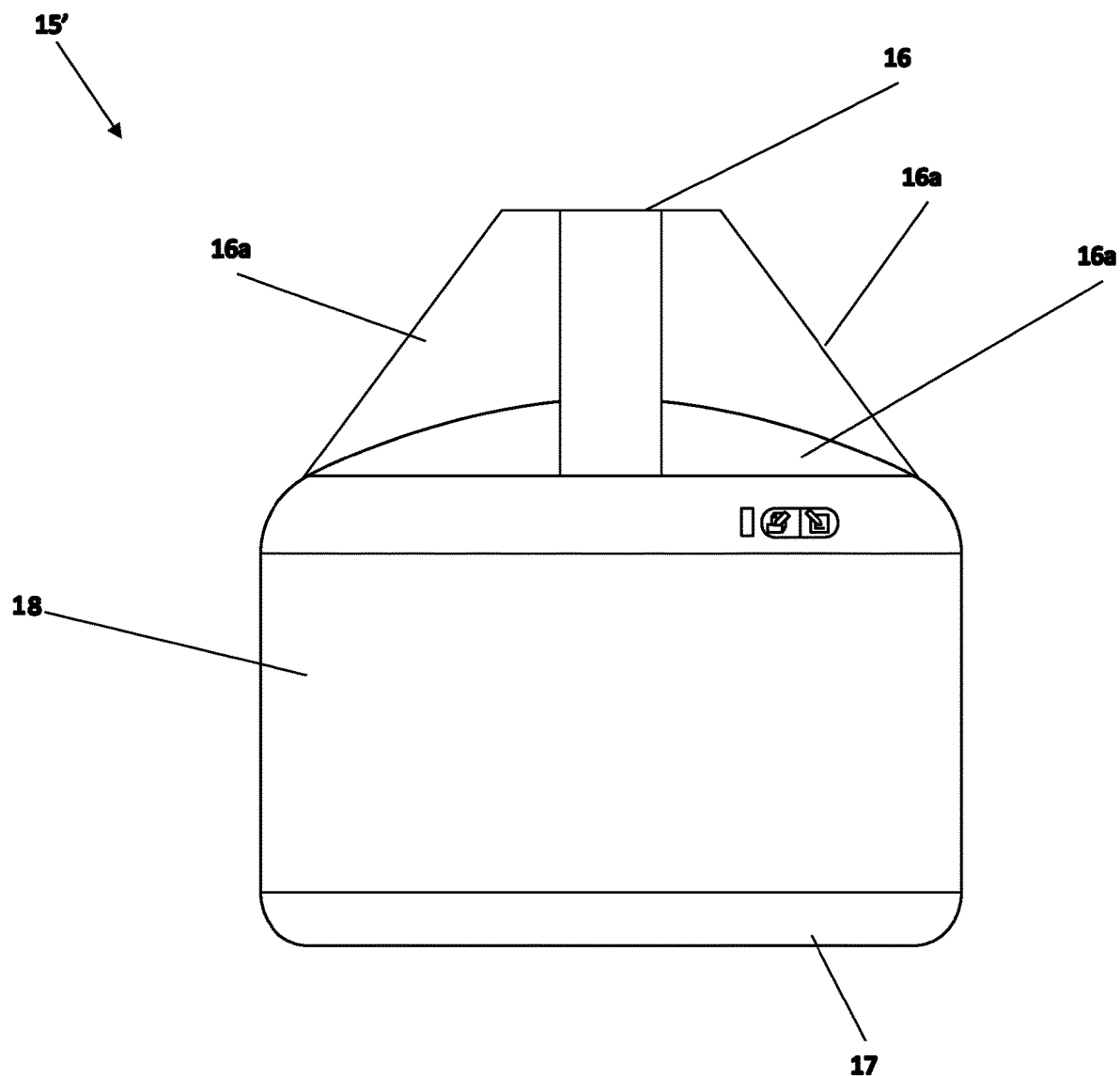
FIG. 11 is a side view of the end cap shown in FIG. 9.
Figure 12:
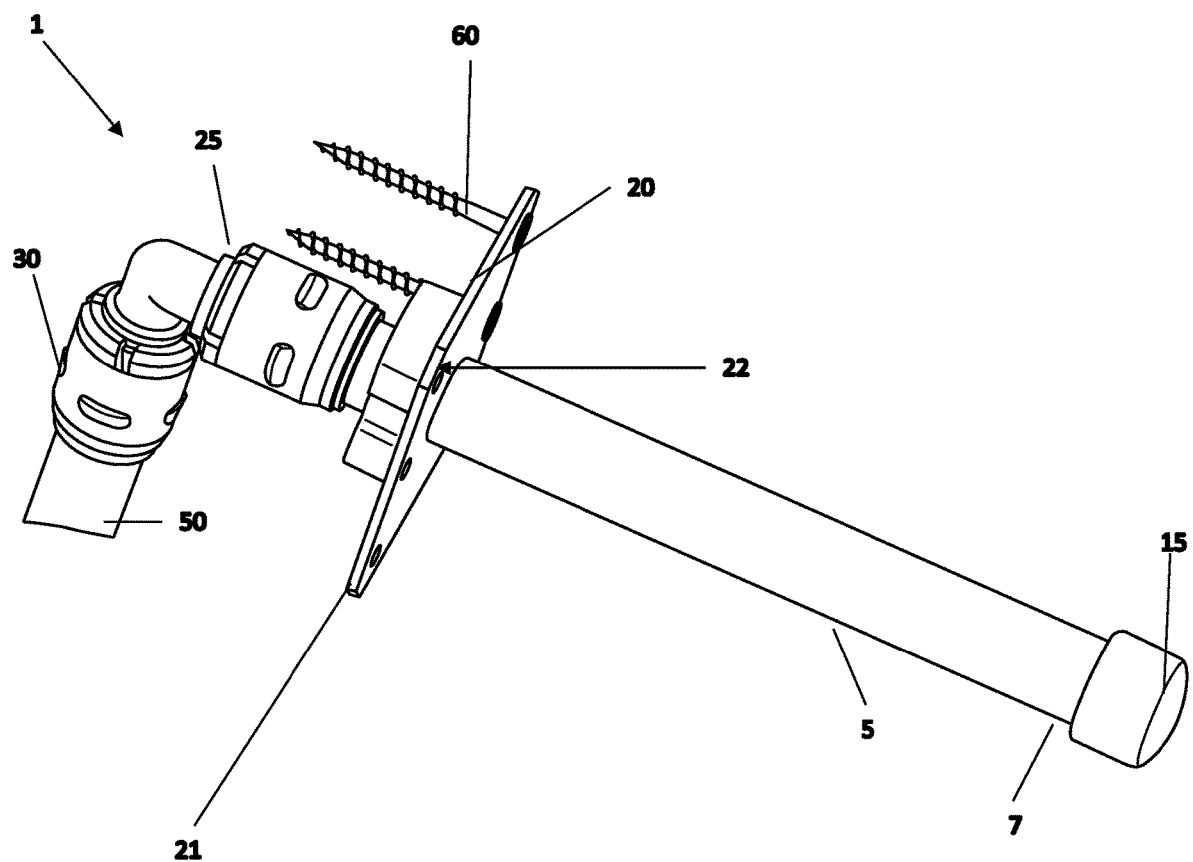
FIG. 12 is a perspective view of the assembly shown in FIG. 3 and the bracket shown in FIG. 7A molded on the tubular member.
Figure 13:
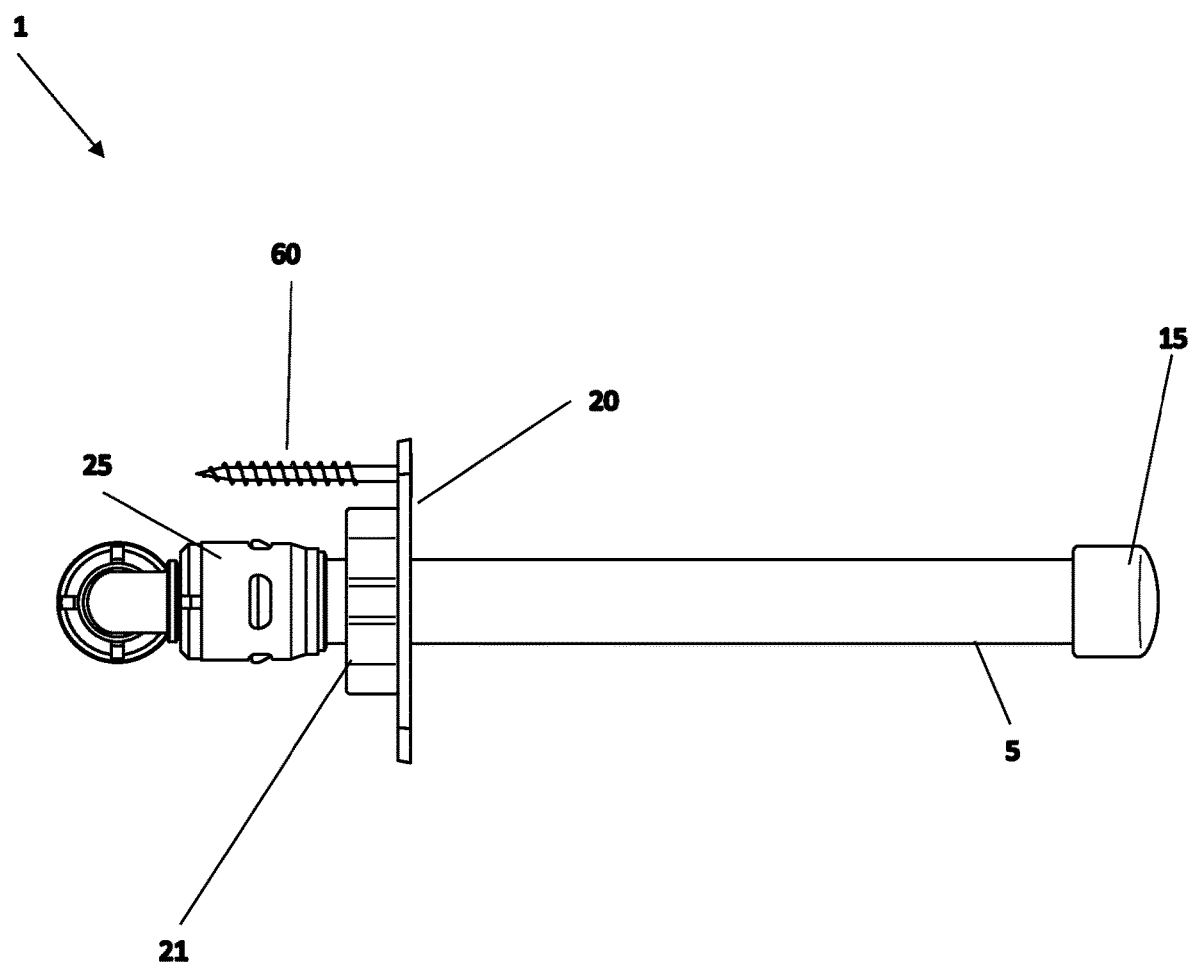
FIG. 13 is a top view of the assembly shown in FIG. 12.
Figure 14:
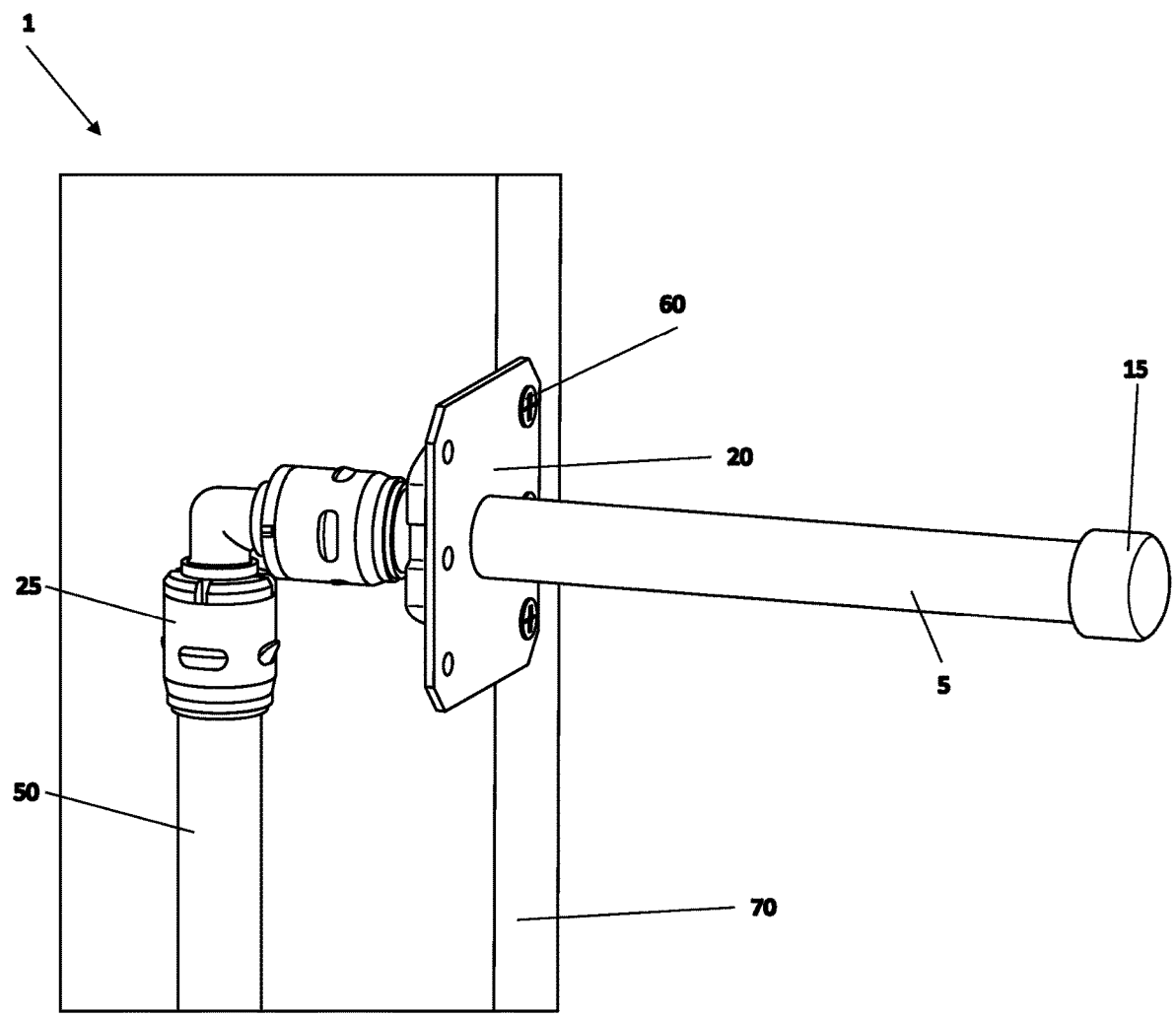
FIG. 14 is a perspective view of the assembly shown in FIG. 12 mounted to a support.
Figure 15:
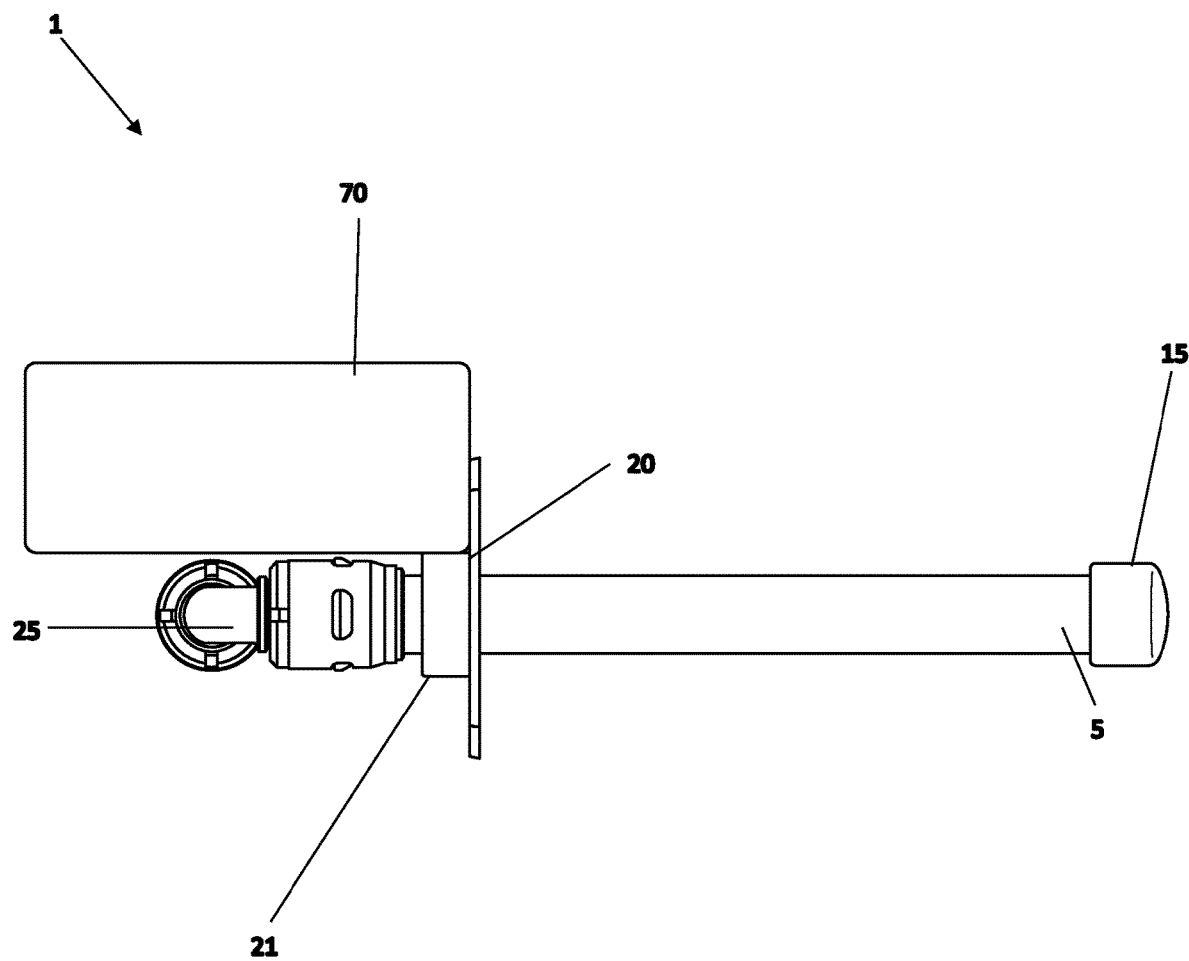
FIG. 15 is a top view of the assembly shown in FIG. 14 mounted to the support.

In at least one implementation, the stub-out assembly may include the end cap 15'. As shown in FIGS. 9-11, the end cap 15' may be the same as the end cap 15 described above, except for the following distinctions. The end cap 15' may include a first, closed end 16 which is pointed in shape. The first, closed end 16 includes a plurality of crossing ribs 16a arranged to create the pointed shape of the first, closed end 16. For example, the pointed shape may be substantially conical, such that the end cap 15' tapers to a conical tip. The plurality of crossing ribs 16a are configured to reinforce the end cap 15' and provide strength so that the end cap 15' can withstand rough handling and forces imparted by a drywall installer during the rough plumbing process and/or subsequent construction after the stub out assembly 1 is installed. Although, as shown in FIGS. 9-11 the plurality of crossing ribs 16a include four ribs 16a, the end cap 15' is not particularly limited to this implementation. For example, the plurality of crossing ribs 16a may include two, three, four, five, six, seven, eight, or more ribs 16a. The first, closed end 16 also includes a rounded base 16b which is configured to provide a seal to the first end 7 of the tubular member 5.

Figure 2:
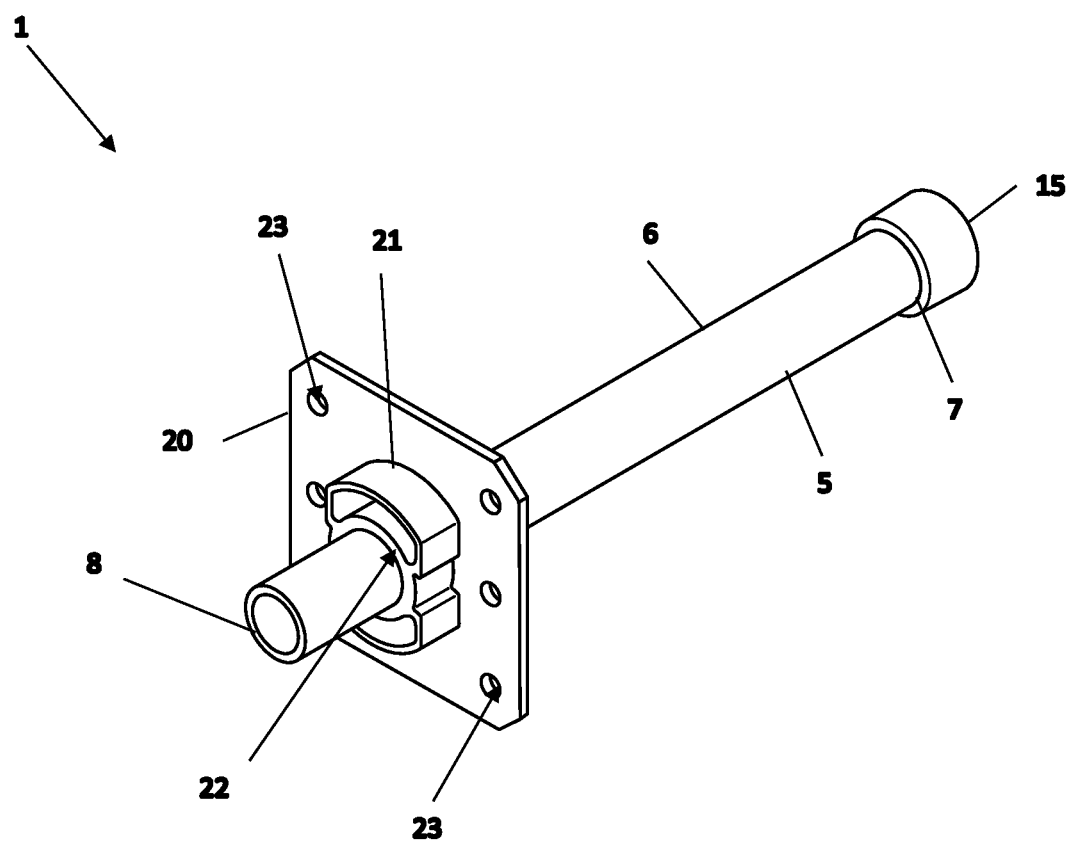
FIG. 2 is a perspective view of an assembly including the tubular member shown in FIG. 1 and a bracket molded on the tubular member.
Figure 3:
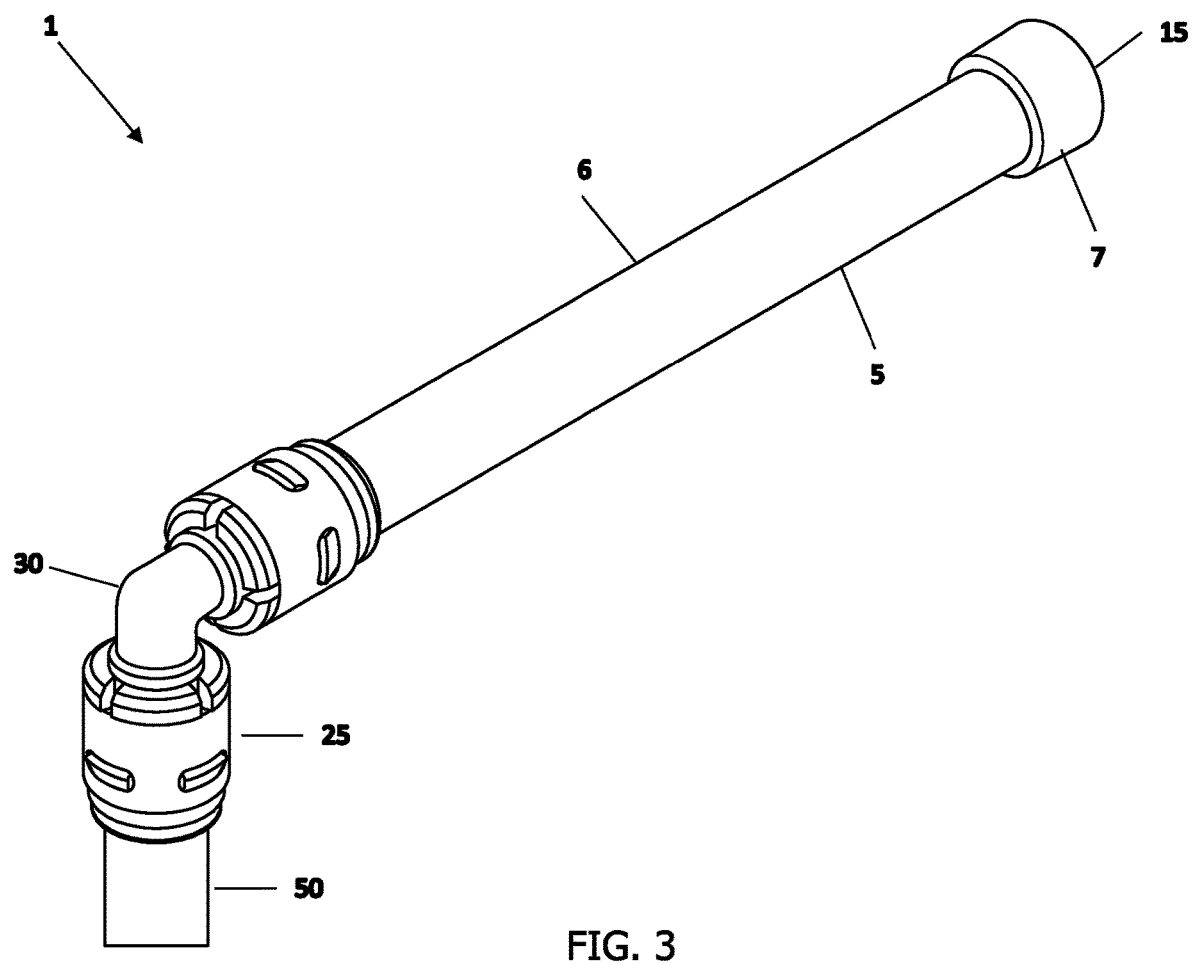
FIG. 3 is a perspective view of an assembly including the tubular member with a molded-on end cap shown in FIG. 1 and further including a fitting.
Figure 4:
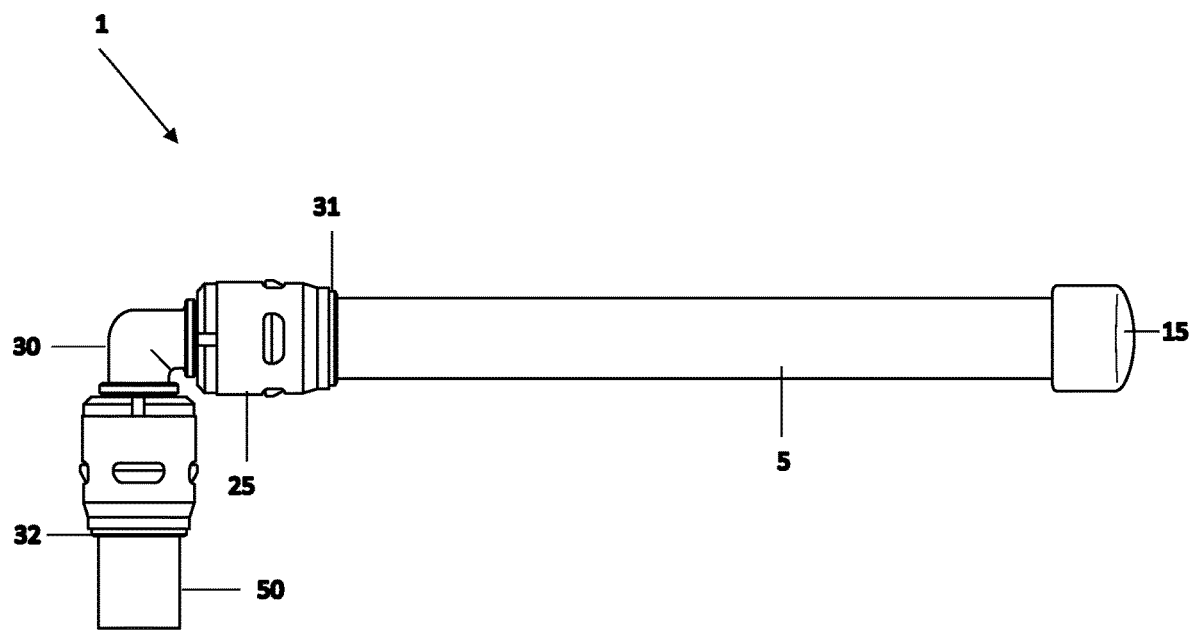
FIG. 4 is a side view of the assembly shown in FIG. 3.

As shown in FIG. 2, the stub out assembly 1 also includes a bracket 20. The bracket 20 is attached (e.g., secured) to middle portion (medial portion) 6 of the tubular member 5. In some implementations, the bracket 20 and tubular member 5 may be joined in a permanent manner. The bracket 20 is configured to mount to an external structure (not shown), such as a wooden stud internal to a wall of a building (e.g., a house) or a metallic bracket structure, and thereby secure at least one end of the tubular member 5 in place so that the stub out assembly 1 remains fixed to the external structure. The bracket 20 is attached to middle portion 6 by any suitable means; for example, bracket 20 may be molded over middle portion 6.

Referring now to FIGS. 2, 5-6, and 7A and 7B, the bracket 20 includes a raised boss portion 21, which is a protrusion. The boss 21, according to one aspect, protrudes 1⅜ inches from the bracket 20. The boss 21 may be configured to allow a plumber to drop a long 'bullet' piece through a hole in a plywood floor that will be drilled at 1⅜ inches diameter, for example. Additionally, the boss 21 provides a flat surface that creates a clearance next to a stud to allow for placement of a fitting 25 (described below). Additionally, the boss 21 is positioned on the bracket 20 (for example, off-set from a center line of the bracket 20) such that the bracket is not immediately up against a stub; this positioning allows the fitting (described below) to be installed on the end 8 of the tubular member 5 in a straight orientation. The boss 21 is disposed around an aperture (e.g., an opening) 22 in bracket 20. The aperture 22 is configured to receive the middle portion 6 of the tubular member such that the outer diameter 11 of tubular member 5 fits through aperture 22. According to one aspect, the aperture 22 is off-set from a center line of the bracket 20 such that the bracket 20 can accommodate already-existing brackets or stub-out portions. The bracket 20 also includes a plurality of screw holes 23 which are configured to house fasteners 60 (shown in FIGS. 12-15) which securably attach the stub out assembly 1 to a building structure, such as a stud internal to a wall.

Figure 7A:
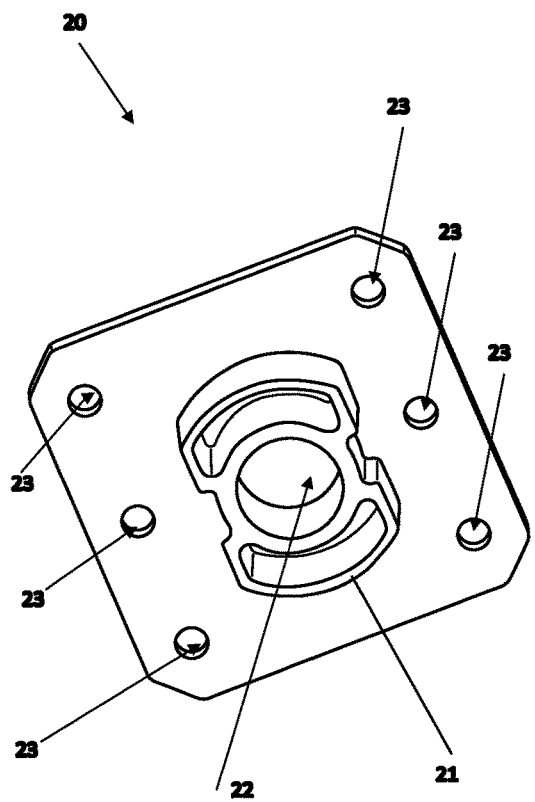
FIG. 7A is a rear perspective view of the bracket, according to one implementation.
Figure 7B:
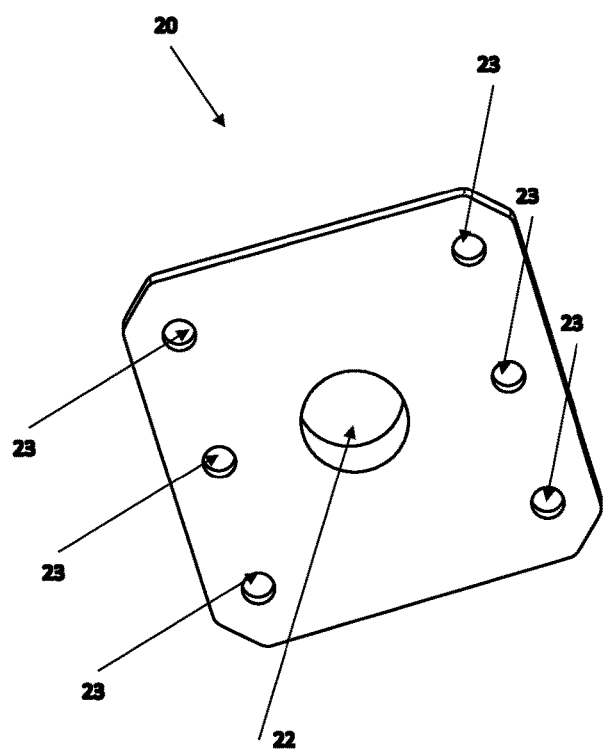
FIG. 7B is a front perspective view of the bracket shown in FIG. 7A.
Figure 7C:
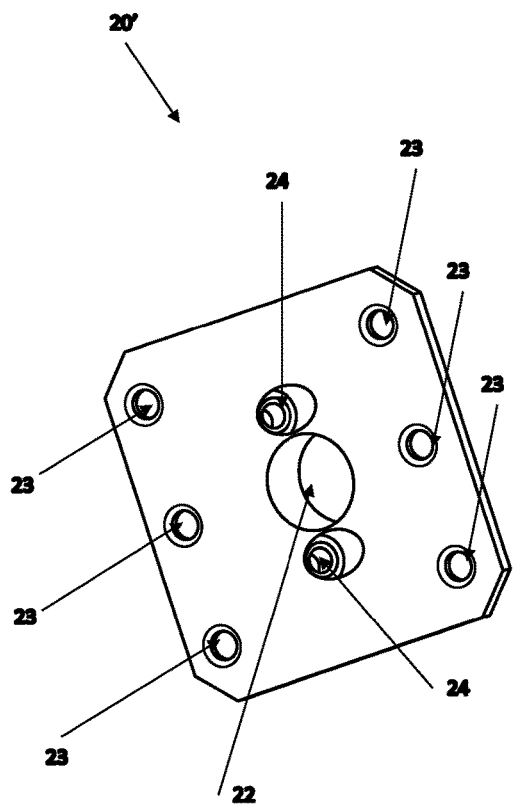
FIG. 7C is a front perspective view of the bracket, according to an additional implementation.
Figure 7D:
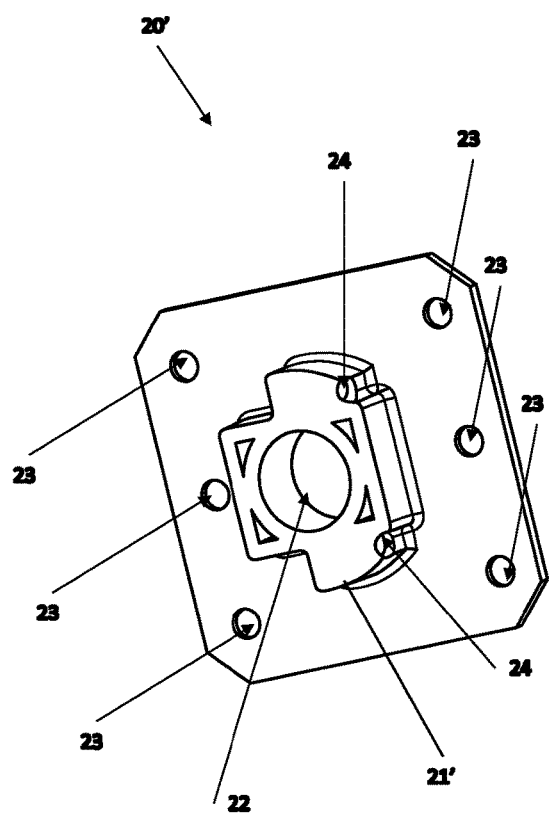
FIG. 7D is a rear perspective view of the bracket shown in FIG. 7C.

According to one aspect of the bracket 20 (shown in FIGS. 7C and 7D), the bracket 20 also includes angled screw holes 24 which are configured to house fasteners 60, which are in turn structured to provide additional stability when the fasteners are secured to the building structure. For example, the angled screw holes 24 are provided at a compound 45 degree angle to either the right or left, relative to a surface of the bracket 20. As another example, each of the angled screw holes 24 includes two different holes with countersunk spaces and is thereby configured to accept the head of a fastener without causing the fastener to protrude into sheetrock. The bracket may further comprise a faceplate which may include an external surface that is visible after installation.

Furthermore, in at least one implementation, by inserting tubular member 5 through aperture 22 of bracket 20, bracket 20 may be positioned and secured to a specific portion of middle portion 6 of tubular member 5 so that bracket 20 can be secured or attached to the external structure. As another example, the bracket 20 may be over-molded onto the tubular member 5.

Figure 16:
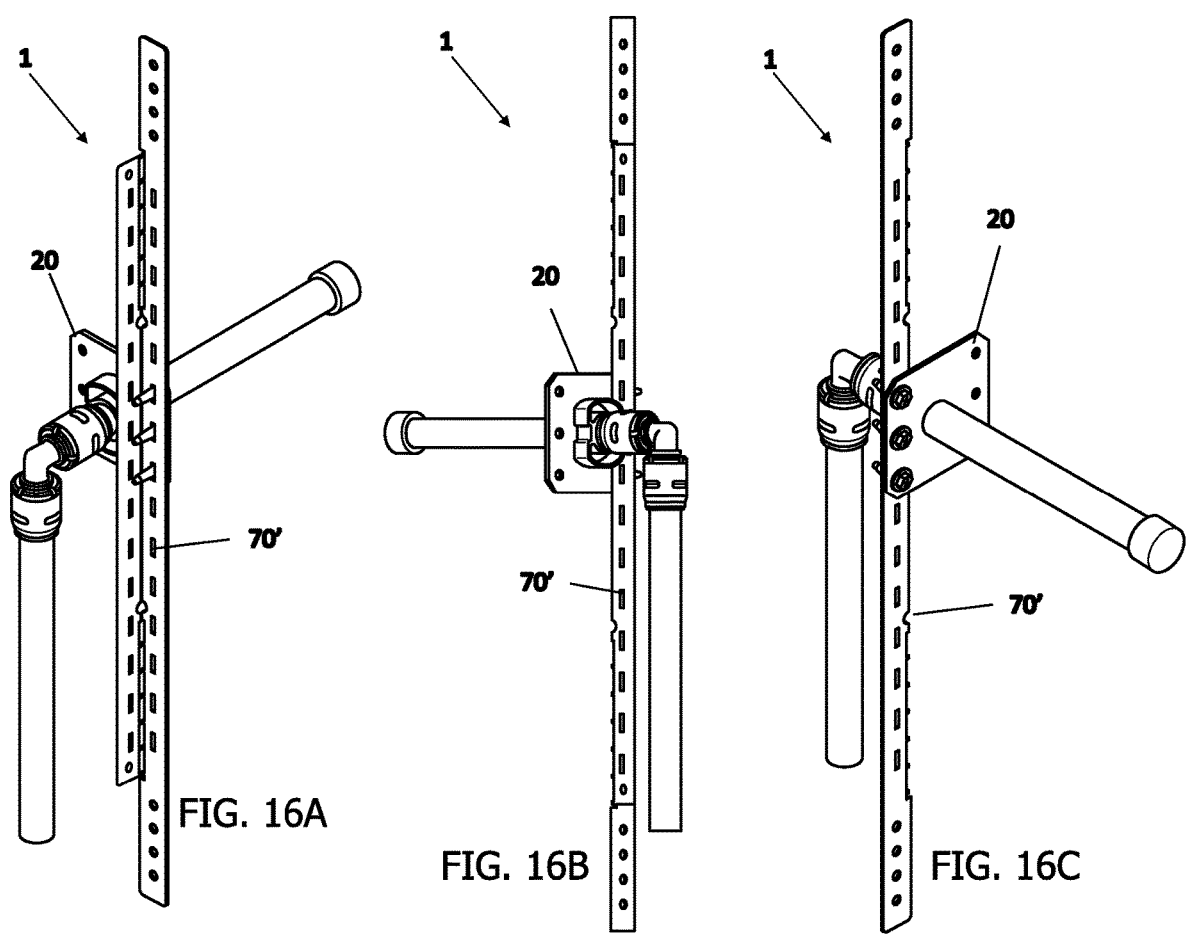
FIG. 16A is a left rear perspective view of a tubular member mounted to a metallic support, according to one implementation.
FIG. 16B is a right rear perspective view of the tubular member mounted to the metallic support, shown in FIG. 16A.
FIG. 16C is a front perspective view of the tubular member mounted to the metallic support, shown in FIG. 16A.

As shown in FIGS. 16A-16C, an assembly 2 includes a bracket 20' (which may be similar or identical to bracket 20 described above), which may be employed to securably attach a tubular member 5' (which may be similar or identical to tubular member 5 described above) to a metallic structure 70'.

According to one aspect, bracket 20 may be made of any suitable material. For example, bracket 20 may be made of PEX, specifically cured PEX. Further, as discussed above, certain components of the assembly 1 are preferably cured. According to one aspect, the curing is performed during manufacturing such that the entire assembly 1 is cured after the various components are assembled together into assembly 1. Furthermore, either or both of the bracket 20 and the end cap 15 may be integrated to the tubular member 5 so as to reduce the number of additional steps and components to complete the assembly 1.

The stub out assembly 1 optionally includes a fitting (i.e., a fixation piece) 25 as shown in FIGS. 3-6. The fitting 25 includes a first end portion 31 and a second end portion 32. The first end portion 31 is configured to secure to the second end 8 of tubular member 5. The second end portion 32 is configured to fluidly communicate the second end 8 of tubular member 5 with another tubular member (not shown), such as a pipe or conduit of a plumbing system. According to one aspect, the fitting 25 includes a fitting joint 30. The fitting 25 may be configured to secure assembly 1 to, for example, a valve, a pipe or another fitting (not shown).

Figure 5:
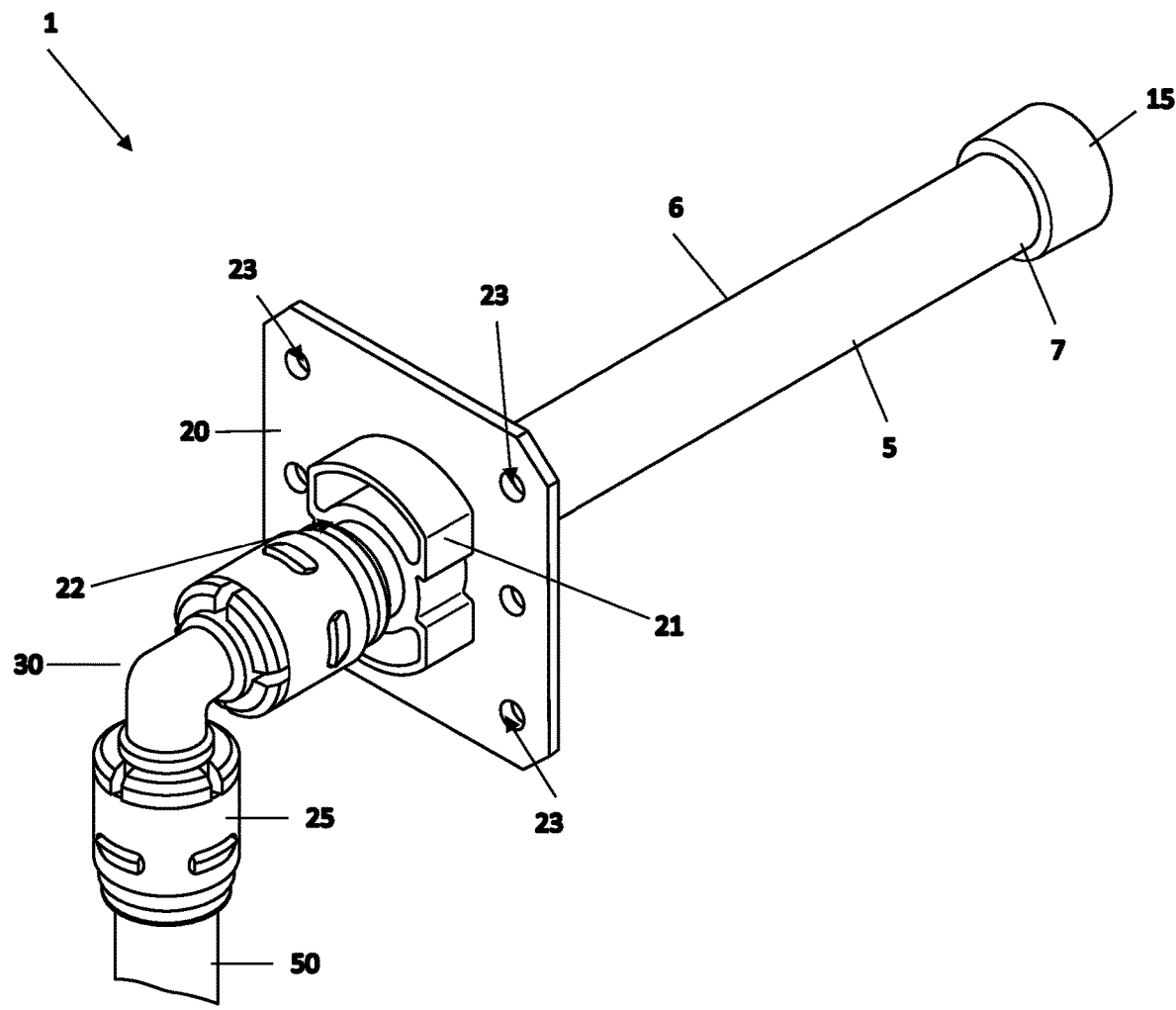
FIG. 5 is a perspective view of an assembly including the tubular member and a molded-on bracket shown in FIG. 2 and further including a fitting.
Figure 6:
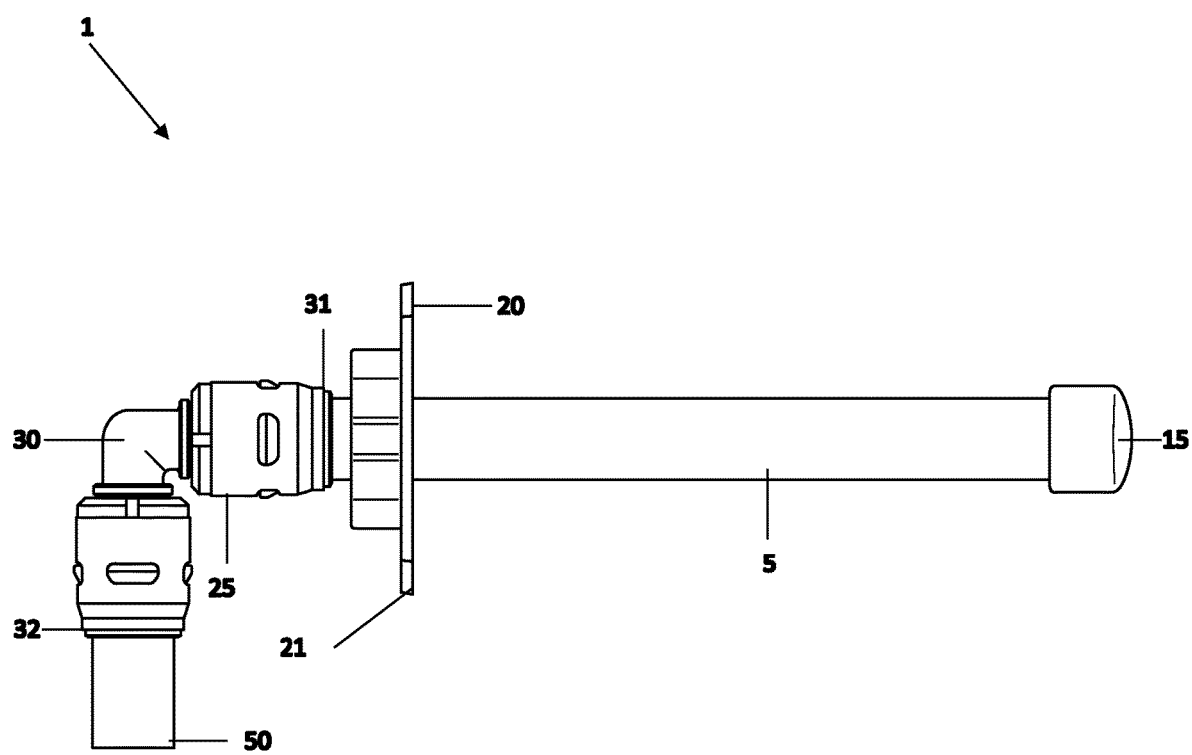
FIG. 6 is a side view of the assembly shown in FIG. 5.
Figure 17:
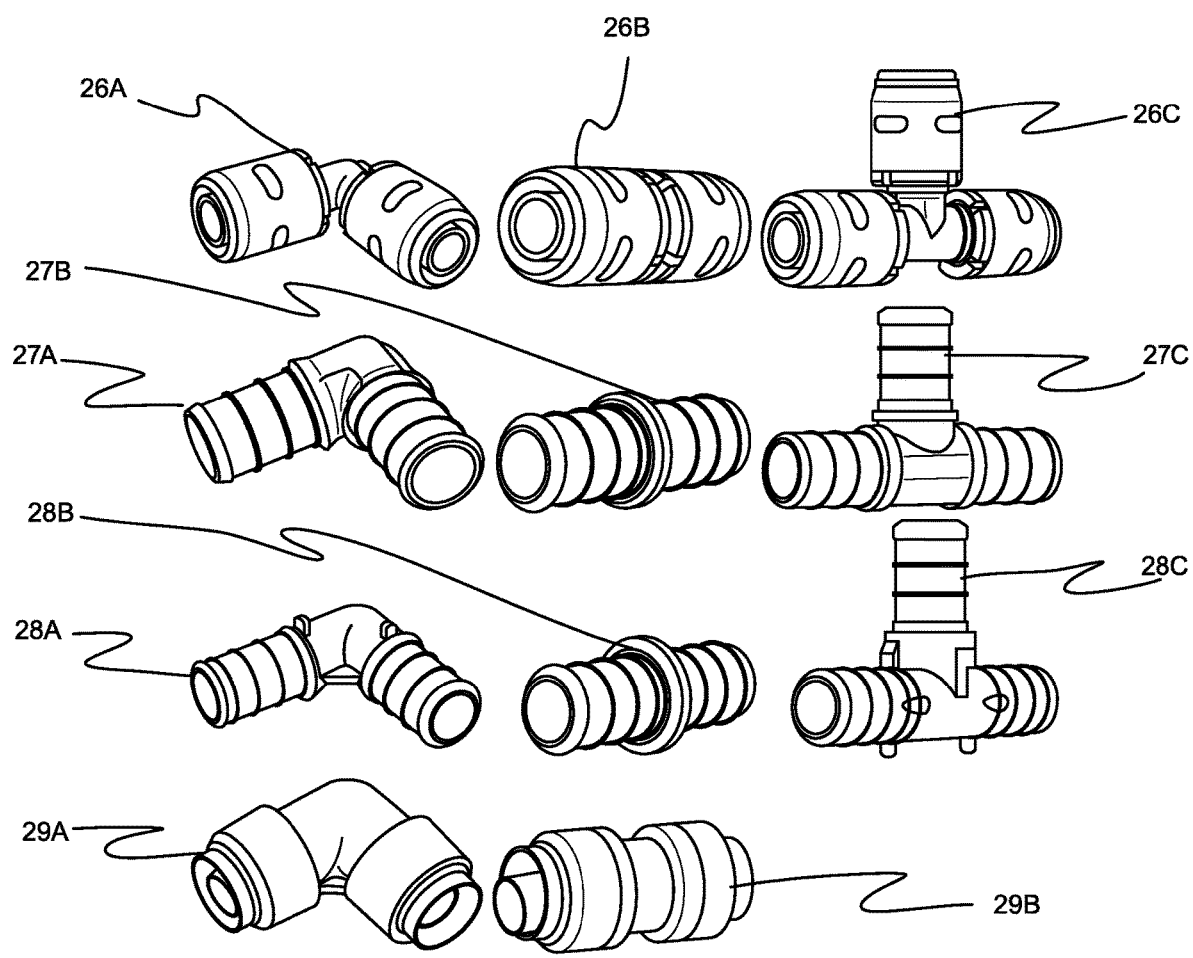
FIG. 17 is a perspective view of a variety of fittings for the assembly shown in FIG. 3.

Various exemplary fittings are shown in FIG. 17. Any of the various exemplary fittings 26-29, as well as others not shown, may be substituted for the fitting 25 in the assembly shown in FIGS. 3-6. As shown in FIG. 17, first fittings 26 include elbow fitting 26A made of EvoPEX® (a registered trademark of Reliance Worldwide Corp. of Atlanta, Ga.), coupling fitting 26B made of EvoPEX®, and tee fitting 26C made of EvoPEX®. Second fittings 27 include brass barbed elbow fitting 27A, brass barbed coupling fitting 27B, and brass barbed tee fitting 27C. Third fittings 28 include plastic barbed elbow fitting 28A, plastic barbed coupling joint 28B, and plastic barbed tee joint 28C. Fourth fittings 29 include SharkBite® (a registered trademark of Reliance Worldwide Corp.) universal elbow fitting 29A and SharkBite® universal coupling fitting 29B. Any of the fittings shown in FIG. 5 are substitutable for the fitting 25 shown in FIGS. 1-4, as well as others not shown.

According to a further exemplary implementation, a method of use of a plumbing stub out assembly in a plumbing system includes the steps of connecting a terminal portion of a conduit in the plumbing system to a fluid source, supporting the terminal portion of the conduit, and installing the stub out assembly 1 on the terminal portion of the conduit. According to one aspect, the method also includes the step of attaching a fitting, such as the fittings 25-29 described above, to secure the fitting to the second end 8 of a tubular member 5 of the stub out assembly 1, the fitting being structured to attach to the plumbing system. According to a further aspect, the method also includes the steps of removing a terminal portion of a first end 7 of the tubular member 5, including end cap 15, and attaching the resulting new tubular member 5 to a fitting, such as a supply fitting, which is configured to secure or otherwise couple the tubular member to an external service.

According to a still further aspect, the method also includes removing the first end 7 of a tubular member 5 of the stub-out assembly 1. The stub out assembly 1 includes a tubular member 5 having a middle portion 6 disposed between a first end 7 and a second end 8, and an end cap 15 over-molded onto the first end 7 of the tubular member 5. The stub out assembly 1 also includes a bracket 20 over-molded onto the middle portion 6 of the tubular member 5. The end cap 15 has an inner diameter configured to fit over an outer diameter of the tubular member 5 such that the end cap 15 seals the first end of the tubular member 5. The fitting 25 has a first end portion 31 configured to affix to the second end 8 of the tubular member 5, and the fitting 25 includes a fitting joint, such as fitting joint 30. According to one aspect, the tubular member 5, bracket 20, and the end cap 15 are made of or include cured PEX.

Figure 18:
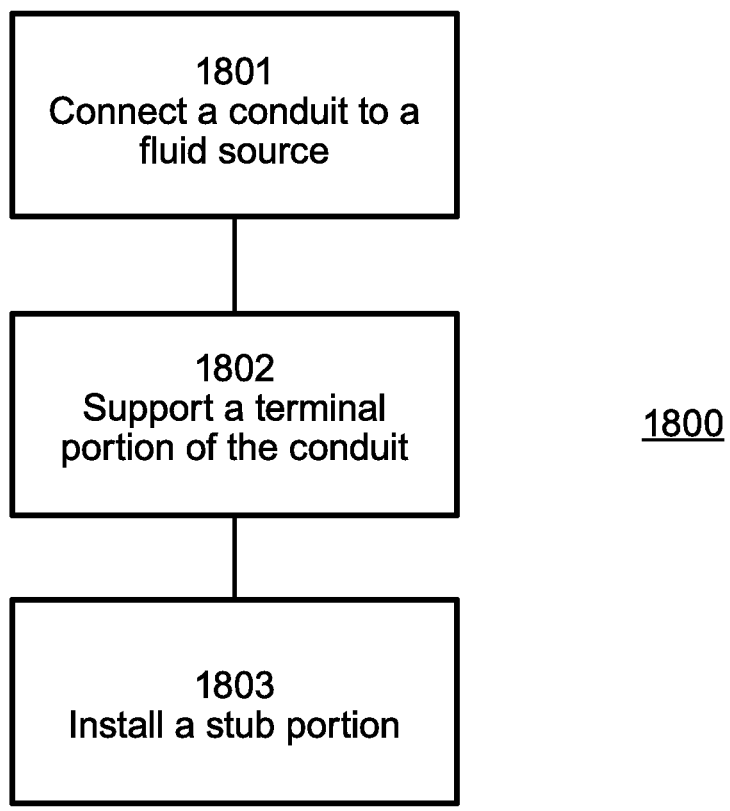
FIG. 18 is a process diagram illustrating a method of using a plumbing stub-out, according to an exemplary implementation.

As shown in FIG. 18, an exemplary method 1800 of use of a plumbing stub portion (e.g., stub out assembly 1) in a plumbing system includes connecting a terminal portion of a conduit or tubular member in the plumbing system to a fluid source (step 1801). The method 1800 also includes supporting the terminal portion of the conduit or tubular member (step 1802). The method 1800 also includes installing the stub portion on the terminal portion of the conduit or tubular member (step 1803). The stub portion comprises a pipe (e.g., tubular member 5) having a middle portion (e.g. medial portion 6) disposed between a first end and a second end (e.g., ends 7 and 8, respectively), and an end cap (e.g., end cap 15) over-molded onto the first end of the pipe. The end cap has an inner diameter configured to fit over an outer diameter of the pipe such that the end cap seals the first end of the pipe.

According to a still further exemplary implementation, a method of making a plumbing component (e.g., stub out assembly 1) includes the steps of inserting a first end 7 of a flexible tubular member 5 into a mold, molding an end cap 15 over the first end 7 of the tubular member 5 to seal the first end of the tubular member, inserting a second end 8 of the tubular member 5 into a mold, and molding at least one support member 20 over the tubular member 5 at a distance from the end cap 15. The method also includes the step of connecting a fitting 25 to the second end 8 of the tubular member 5 which defines a flow passageway. The fitting 25 is structured to attach to a fluid conduit in the plumbing system (not shown) to communicate the fluid conduit with the second end 8 of the tubular member 5. The support member 20 is molded over a central portion 6 of the tubular member 5, and is positioned and configured to be communicated with a structural system of a building. The tubular member 5, end cap 15 and support member 20 may be of various suitable materials, but preferably are all made of PEX.

Figure 19:
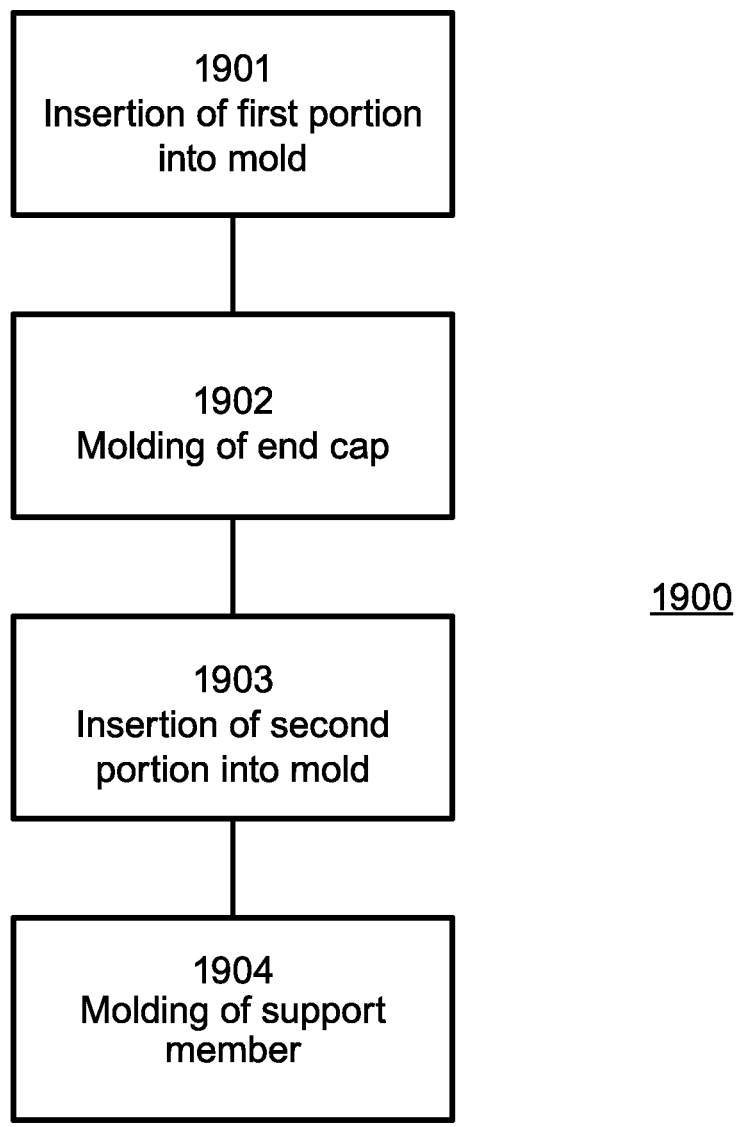
FIG. 19 is a process diagram illustrating a method of making a plumbing component, according to an exemplary implementation.

As shown in FIG. 19, an exemplary method 1900 of making a plumbing component (e.g., stub out assembly 1) includes inserting a first end 7 of a flexible tubular member 5 into a mold (step 1901). The method 1900 also includes molding an end cap 15 (a sealing portion) over the first end 7 of the tubular member 5 to seal the first end of the tubular member (step 1902). According to one aspect of the method 1900, the entire tubular member 5 is inserted into the mold. The method 1900 also includes inserting a second end 8 of the tubular member 5 into a mold (step 1903). The method also optionally includes molding at least one support member 20 over the tubular member 5 at a selected distance (e.g., a predetermined distance) from the end cap 15 (step 1904).

As utilized herein, the terms "approximately," "about," "substantially," and similar terms are intended to have a broad meaning in harmony with the common and accepted usage by those of ordinary skill in the art to which the subject matter of the disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

The terms "coupled," "connected" and the like are used herein to mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the Figures. It should be noted that the orientation of various elements may differ according to other exemplary implementations and that such variations are intended to be encompassed by the present disclosure.

It is to be understood that although the present invention has been described with regard to implementations thereof, various other implementations and variants may occur to those skilled in the art, which are within the scope and spirit of the invention, and such other implementations and variants are intended to be covered by corresponding claims. Those skilled in the art will readily appreciate that many modifications are possible (e.g., variations in sizes, structures, shapes and proportions of the various elements, mounting arrangements, use of materials, orientations, etc.) without materially departing from the novel teachings and advantages of the subject matter described herein. For example, the order or sequence of any process or method steps may be carried or re-sequenced according to alternative implementations. Other substitutions, modifications, changes, and omissions may also be made in the design, operating conditions and arrangement of the various exemplary implementations without departing from the scope of the present disclosure.

With respect to the use of substantially any plural and/or singular terms herein, those having skill in the art can translate from the plural to the singular and/or from the singular to plural as is appropriate to the context or application. The various singular/plural permutations may be expressly set forth herein for clarity.

What is claimed is:

1. An assembly comprising:
   a tubular member having a medial portion defined between a first end and a second end of the tubular member;
   an end cap over-molded to the first end of the tubular member such that an inner diameter of the end cap fits over an outer diameter of the tubular member and the end cap fluidly seals and is integrated with the first end and the outer surface of the tubular member, wherein the end cap extends along at least a portion of the outer surface of the tubular member; and
   a bracket attached to and over-molded onto the medial portion of the tubular member such that the bracket is integrated with the tubular member, wherein the bracket is configured to mount to a structure, the bracket adapted to secure at least one end of the tubular member in place.

2. The assembly according to claim 1, wherein the tubular member, end cap, and bracket comprise cross-linked polyethylene.

3. The assembly according to claim 1, further comprising a fitting including a first end portion configured to secure to the second end of the tubular member,
   wherein the fitting is configured to communicate the second end of the tubular member with another tubular member.

4. The assembly according to claim 3, wherein the fitting comprises a fitting joint.

5. The assembly according to claim 1, wherein the bracket includes an aperture configured to receive the tubular member.

6. The assembly according to claim 5, wherein the bracket and tubular member are permanently joined together.

7. The assembly according to claim 1, wherein the end cap covers an entirety of a first planar surface of the first end of the tubular member, and at least part of a side portion along the outer surface of the tubular member.

8. The assembly according to claim 7, wherein the end cap comprises a plurality of ribs that form a substantially conical shape and are configured to reinforce the end cap.

9. The assembly of claim 1, wherein the end cap encases the first end of the tubular member such that the end cap isolates an outer diameter portion of the outer surface of the first end of the tubular member from an external environment, wherein the end cap fluidly seals with the first end of the tubular member by direct contact between a surface of the end cap and the first end of the tubular member.

* * * * *